United States Patent
Song et al.

(10) Patent No.: US 8,862,726 B1
(45) Date of Patent: Oct. 14, 2014

(54) QUANTIFYING PRIVACY LEAKAGE IN MOBILE NETWORKS

(75) Inventors: Han See Song, San Jose, CA (US); Yong Liao, Sunnyvale, CA (US); Marios Iliofotou, Sunnyvale, CA (US); Ning Xia, Evanston, IL (US); Zhi-Li Zhang, Eden Prairie, MN (US); Aleksandar Kuzmanovic, Evanston, IL (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 346 days.

(21) Appl. No.: 13/444,525

(22) Filed: Apr. 11, 2012

(51) Int. Cl.
*G06F 15/173* (2006.01)
*G06F 15/16* (2006.01)

(52) U.S. Cl.
USPC .......................................... 709/224; 709/227

(58) Field of Classification Search
USPC ................................................. 709/224, 227
See application file for complete search history.

(56) References Cited

U.S. PATENT DOCUMENTS

| | | | | |
|---|---|---|---|---|
| 2006/0085401 | A1* | 4/2006 | Anderson et al. | 707/3 |
| 2011/0041076 | A1* | 2/2011 | Sinn et al. | 715/745 |
| 2013/0074109 | A1* | 3/2013 | Skelton et al. | 725/14 |

OTHER PUBLICATIONS

Krishnamurthy, B., et al., "On the Leakage of Personally Identifiable Information Via Online Social Networks". In Proceedings of ACM WOSN, pp. 7-12, Aug. 2009.
Xu, Qiang, et al., "Identifying Diverse Usage Behaviors of Smartphone Apps", In Proceedings of IMC, Nov. 2011.
Keralapura, R., et al., "Profiling Users in a 3G Network Using Hourglass Co-Clustering", In Proceedings of ACM MOBICOM, pp. 341-352, Sep. 2010.

* cited by examiner

*Primary Examiner* — Ebrahim Golabbakhsh
(74) *Attorney, Agent, or Firm* — Fernandez & Associates, LLP

(57) ABSTRACT

A method for profiling user activity in a mobile network, including extracting user identifiers from application sessions identified from a mobile network, analyzing the application sessions to determine session blocks based on shared IP address and a minimum separation time threshold, extracting a traffic marker from the session blocks based on a user identifier, identifying a first portion of the session blocks based on the user identifier, wherein the first portion is associated with first mobile network activities of a user identified by the user identifier, identifying a second portion of the session blocks based on the traffic marker, wherein the second portion is associated with second mobile network activities of the user, and analyzing the first portion and the second portion to determine a measure of a mobile network activity of the user.

18 Claims, 5 Drawing Sheets

QUANTIFYING PRIVACY LEAKAGE IN MOBILE NETWORKS

BACKGROUND OF THE INVENTION

1. Field of the Invention

The present invention relates to computers and computer networks. More particularly, the invention relates to analyze user activities in a mobile network and identity privacy leakage therefrom.

2. Background of the Related Art

For a growing number of users, online social networking (OSN) sites have become an integral part of their online activities. These OSN sites often function as the portal and launching points from where users receive news updates, venture over to other sites, and so forth. In addition, many websites now also have ties-in with various OSN sites, e.g., enticing users to recommend or comment on news items, web posts, etc. via a simple click of buttons. With wide adoption of modern GPS-equipped touch-sensitive smart phones and emergence of various mobile applications and services (e.g., location-based services), information access is nearly ubiquitous and literally at the fingertip.

With all the value and convenience it brings to users' personal, social, and professional lives, this new era of smart phones and online social networking also presents a quandary to users: how to, or is it even possible to, preserve privacy in this new era? Different from their earlier incarnations, today's OSN sites require users to register using their true identities (at least in principle). In addition to all the personal data (e.g., age, gender, personal photos, friends), these sites also track and record a variety of user online activities, such as messages exchanged and content shared with others, articles read and commented on, pictures browsed or video watched on the sites and other affiliated sites. At the same time, when accessing OSNs and mobile services on smart phones, users' current physical information may also be recorded and tracked due to the common use of automatic updates of location-specific contents.

SUMMARY

The problem of understanding the content on the Web is referred to as Web Content Cartography. In this context, embodiments of the invention provides a novel passive traffic monitoring system that helps in understanding the mapping between users, content owners, and the hosts serving the content. It leverages the public information available in the network (e.g., DNS queries and responses, service provider specific info mined from traffic payloads, other public user info from web crawls, etc.), correlates them to the actual data flows to not only reveal the aforementioned mapping, but also shed light on several other problems like port-service mapping, automatic service label extraction, and pure flow-set generation, etc. Generally, these issues have been addressed using manual approaches.

In general, in one aspect, the present invention relates to a method for profiling user activity in a mobile network. The method includes identifying, from the mobile network, a plurality of application sessions, extracting, by a computer processor, a plurality of user identifiers from the plurality of application sessions based on a pre-determined criterion, analyzing, by the computer processor, the plurality of application sessions to determine a plurality of session blocks, wherein each session block comprises a plurality of application sessions sharing an IP address and is defined based on a minimum separation time with any other session block sharing the IP address, extracting, by the computer processor, a traffic marker from the plurality of session blocks based on a user identifier of the plurality of user identifiers, identifying a first portion of the plurality of the session blocks based on the user identifier, wherein the first portion of the plurality of the session blocks is associated with first mobile network activities of a user identified by the user identifier, identifying a second portion of the plurality of the session blocks based on the traffic marker, wherein the second portion of the plurality of the session blocks is associated with second mobile network activities of the user, and analyzing, by the computer processor, the first portion and the second portion of the plurality of the session blocks to determine a measure of a mobile network activity of the user.

In general, in one aspect, the present invention relates to a system for profiling user activity in a mobile network. The system includes (i) a processor and memory, (ii) a session block generator comprising instructions stored in the memory, when executed on the processor having functionality to identify, from the mobile network, a plurality of application sessions, and analyze the plurality of application sessions to determine a plurality of session blocks, wherein each session block comprises a plurality of application sessions sharing an IP address and is defined based on a minimum separation time with any other session block sharing the IP address, (iii) a user session block identifier comprising instructions stored in the memory, when executed on the processor having functionality to extract a plurality of user identifiers from the plurality of application sessions based on a pre-determined criterion, extract a traffic marker from the plurality of session blocks based on a user identifier of the plurality of user identifiers, identify a first portion of the plurality of the session blocks based on the user identifier, wherein the first portion of the plurality of the session blocks is associated with first mobile network activities of a user identified by the user identifier, and identify a second portion of the plurality of the session blocks based on the traffic marker, wherein the second portion of the plurality of the session blocks is associated with second mobile network activities of the user, and (iv) a user activity analyzer comprising instructions stored in the memory, when executed on the processor having functionality to analyze the first portion and the second portion of the plurality of the session blocks to determine a measure of a mobile network activity of the user.

In general, in one aspect, the present invention relates to a non-transitory computer readable medium embodying instructions for profiling user activity in a mobile network. The instructions when executed by a processor includes functionality for identifying, from the mobile network, a plurality of application sessions, extracting a plurality of user identifiers from the plurality of application sessions based on a pre-determined criterion, analyzing the plurality of application sessions to determine a plurality of session blocks, wherein each session block comprises a plurality of application sessions sharing an IP address and is defined based on a minimum separation time with any other session block sharing the IP address, extracting a traffic marker from the plurality of session blocks based on a user identifier of the plurality of user identifiers, identifying a first portion of the plurality of the session blocks based on the user identifier, wherein the first portion of the plurality of the session blocks is associated with first mobile network activities of a user identified by the user identifier, identifying a second portion of the plurality of the session blocks based on the traffic marker, wherein the second portion of the plurality of the session blocks is associated with second mobile network activities of the user, and analyzing the first portion and the second portion of the plurality of the session blocks to determine a measure of a mobile network activity of the user.

Other aspects and advantages of the invention will be apparent from the following description and the appended claims.

DETAILED DESCRIPTION

Figure 1A:
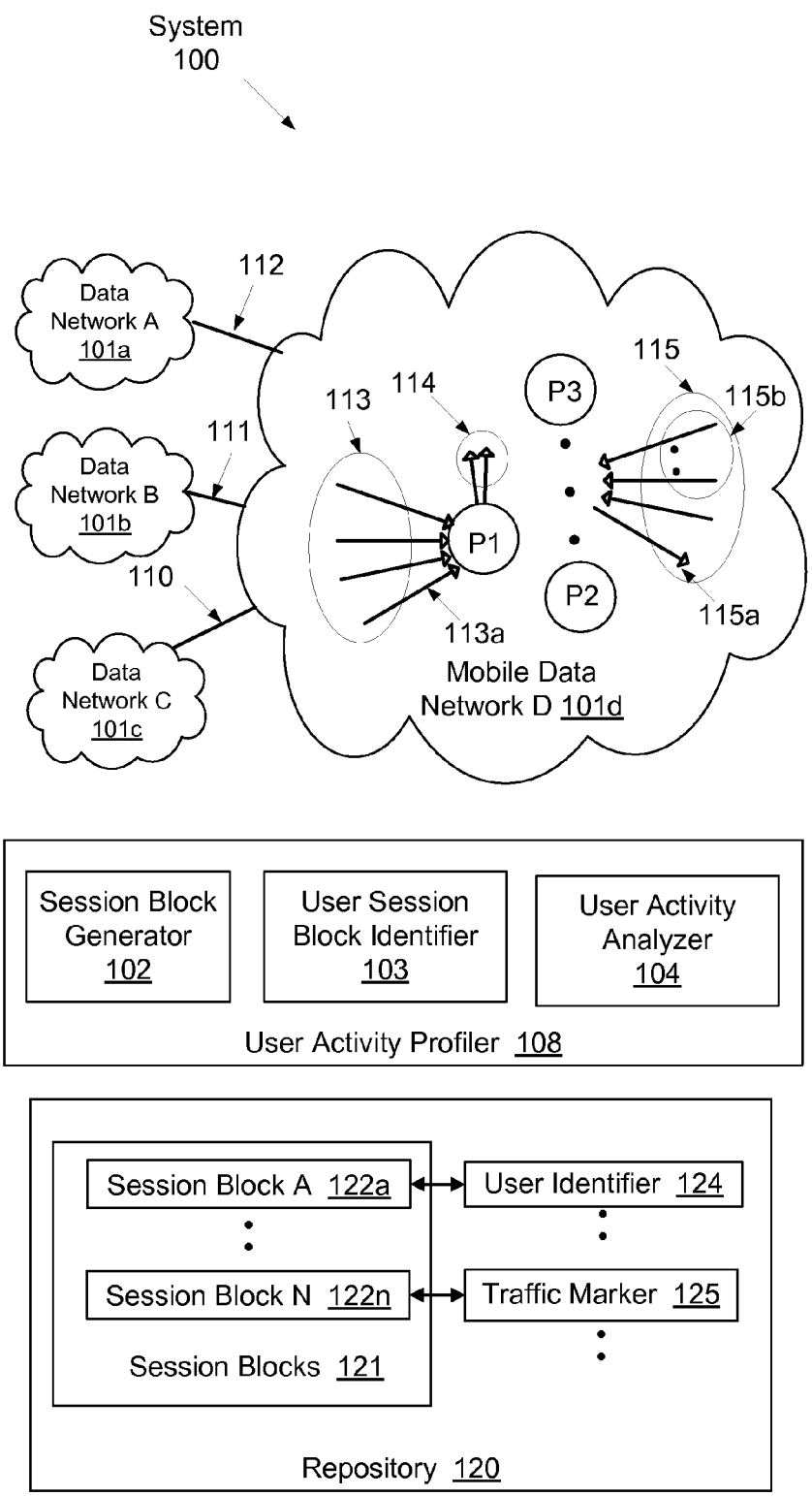
FIG. 1A shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally, a flow (e.g., a TCP flow) between two network hosts (e.g., a client and a server in a client-server application scenario) is a series of data records (referred to as packets or data packets, e.g., IP packets) regarding the communication between the two network hosts engaged in an Internet transaction. The Internet transaction may be related to completing a task, which may be legitimate or malicious. Each packet includes a block of data (i.e., actual packet content referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow and sequence information identifying a logical position of the packet in the flow. Said in other words, a flow consists of one or more packets having the same 5-tuple identifier, aggregate based on sequence information contained in the headers of the packets, and transmitted within a defined time window. Typically, a user command to execute an application initiates a flow from an application client (i.e., source address=client IP) to an application server (i.e., destination address=server IP), which is preceded by DNS flows (i.e., DNS query and DNS response) between the client IP and a DNS server to identify the server IP based on a domain name contained in the user command. Termination (or completion) of the flow may be marked by a TCP packet flag (e.g., "connection reset" or "fin") or if a time-out condition occurs when no more packet having the 5-tuple identifier is transmitted in the sequence beyond a pre-determined time-out period since the last transmitted packet in the flow. This time-out period may be heuristically determined by the application and is generally set at 2 min.

Throughout this disclosure, the terms "traffic flow," "data flow," "flow," "traffic stream," and "stream" are used interchangeably and may refer to a uni-directional flow, a bi-directional flow, a complete flow or any portion thereof unless explicitly stated otherwise. For example, a bi-directional flow may include a client-to-server uni-directional flow and a server-to-client uni-directional flow that are identifiable based on the flow header information. Further, the term "transport protocol" refers to a protocol associated with or based on top of a transport layer of a computer network. For example, the transport protocol may be referred to as layer-four (L4) protocol with respect to the OSI model (i.e., Open Systems Interconnection Reference Model of the network architecture). Examples of layer-four protocols include TCP, UDP, etc.

Further, the terms "user computing device," "mobile device," "device" "smartphone," "tablet computer," "notebook computer" are used interchangeably depending on the context.

Further still, the term "application" or "network application" refers to an application associated with or based on top of an application layer of a computer network. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent® (a registered trademark of BitTorrent, Inc., San Francisco Calif.), GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy.

Generally, many OSN sites incorporate the user OSN identifiers in the HTTP headers (e.g., cookies) either for user authentication or for tracking user inside the OSN without requiring repeated sign-ins. Embodiments of the invention use extracted OSN identifiers to identify and associate network traffic generated by other online activities of each OSN user. While dynamic IP assignment by the mobile network service providers scatters a user's mobile traffic to multiple IP addresses over time, the same IP address stays with the same mobile device for a (short) period (e.g., a few seconds) until the device becomes idle. Leveraging this feature of mobile data networks, traffic flows on each IP address are segmented into blocks of generally short durations and associated/attributed to individual OSN users. Generally, cookies and related HTTP header fields are used by web services to keep track of users and devices. In one or more embodiments, relevant cookies and related HTTP header fields that can persistently or uniquely associate certain web activities to specific OSN users are automatically filtered and extracted, which are collectively referred to as traffic markers.

Once traffic blocks are extracted and attributed to individual OSN users, respective user information of various kinds may then be obtained using data mining techniques. For example, user activity analysis may be conducted based on the DNS names associated with various services/sites they visit to classify and analyze users' distinct activity fingerprints representing users' habitual online activities.

FIG. 1A shows a system block diagram of a system (100) in accordance with one or more embodiments of the invention. Those skilled in the art, having the benefit of this detailed description, will appreciate the components shown in FIG. 1A may differ among embodiments of the invention, and that one or more of the components may be optional. Although specific numbers of components are shown in FIG. 1A, different number of each component may be included. In one or more embodiments of the invention, one or more of the components shown in FIG. 1A may be omitted, repeated, supplemented, and/or otherwise modified from that shown in FIG. 1A. Accordingly, the specific arrangement of components shown in FIG. 1A should not be construed as limiting the scope of the invention.

A shown in FIG. 1A, the system (100) includes data networks A through D (101a, 101b, 101c, 101d), a user activity profiler (108) having a session block generator (102), a user session block identifier (103), and a user activity analyzer (104), and a repository (120) storing session blocks (121) (e.g., session block A (122a), session block N (122n), user identifiers (e.g., user identifier (124)), and traffic markers (e.g., traffic marker (125)). Each of these networks A through D may be a portion of a larger network and are shown to be coupled via links (110, 111, 112). This larger network may include wired/wireless portions of local area network, wide area network, Internet, and/or other computer and communication networks. In particular, the network D (101d) is a mobile data network, also referred to as a mobile network, such as a cellular phone network. The mobile data network D (101d) includes hosts (P1, P2, P3, etc.). As shown, host (P1) is a source or destination associated with flows (113, 114) while hosts (P2, P3, etc.) are source(s) or destination(s) associated with flows (115). Accordingly, the flows (113, 114) are referred to as attached to the server (P1) while the flows (115) are referred to as attached to the servers (P2, P3, etc.). In particular, the flows (113) include a particular flow (113a) while the flows (115) include another particular flow (115a). Further, a portion of the flows (115) is a set of unidirectional flows (115b). In one or more embodiments of the invention, each flow in these flows (113, 114, 115) relates to an application executing on the attached server at a particular time. For example, flows (113) may include commands (e.g., HTTP command such as GET, POST, DELETE, etc.) of an application sent from various clients (not shown) to the server (P1) while the flows (114) may include responses (e.g., HTTP response such as 200 OK, 404 Not Found, etc.) of the application sent from the server (P1) to various clients in return. Accordingly, the flows (113, 114) are referred to as "associated with an application executing on server (P1)", "corresponding to an application executing on server (P1)", "generated by an application executing on server (P1)", "generated to execute an application on server (P1)", or "generated for executing an application on server (P1)" in an interchangeable manner depending on the context unless explicitly stated otherwise. Although the servers P1, P2, and P3 are shown to be within the mobile data network D (101d), one or more of these servers may also be part of other data networks (e.g., data network A through C (101a, 101b, 101c)) and accessible from within the mobile data network D (101d).

In one or more embodiments of the invention, the client devices (not shown) associated with the aforementioned flows in the mobile data network (101d) are mobile computing devices configured with wireless communication capabilities, such as smartphones, tablet computers, notebook computers, etc. In one or more embodiments, users of these mobile computing devices access the services provided by various servers (e.g., P1, P2, P3, etc.) using connection provided by mobile data network service providers (not shown), such as a cellular phone service provider. In one or more embodiments, the mobile data network service providers (not shown) assign different IP address to a user mobile computing device for different application sessions. Said in other words, an IP address may be dynamically assigned to different user computing device during different time periods.

In one or more embodiments of the invention, data packets of the network traffic flows (e.g., flows (113), flows (114), flows (115), flows (115b), etc.) may be observed and collected, for example using a sniffer device from links (110, 111, 112). The collected data packets may be filtered and organized regarding duplicate records or out-of-order records. Accordingly, the collected data packets are reconstructed into a flow in an appropriated order (e.g., based on sequence information in the headers) consistent with the Internet transaction performed by the flow. Throughout this disclosure, "obtaining a flow" may refer to obtaining a complete flow or any portion thereof depending on the context unless explicitly stated otherwise.

As noted above, in client-server application scenarios, flows generated by the application are preceded by DNS flows to identify the server IP from domain name in a client command. For example, the client requests content from a server in the network by specifying the domain name of the server in the request command. The actual server IP address is then returned by DNS mechanism (e.g., a DNS server) of the network based on the domain name. Throughout this disclosure, the terms "content," "resource," and "service" may be used interchangeably to refer to any of content/resource/service requested by a client and provided by a server. Further, the terms "client," "client device," "client IP," and "client IP address" may be used interchangeably depending on the contexts; the terms "server," "server device," "server IP," and "server IP address" may be used interchangeably depending on the contexts.

In one or more embodiments of the invention, the user activity profiler (108) includes the session block generator (102) that is configured to identify, from the mobile data network D (101d), application sessions each containing flows such as flows (113), flows (114), flows (115), flows (115b), etc. Specifically, the 5-tuple flows are parsed into application sessions according to the specific protocol. For example, all HTTP requests and replies of the same persistent TCP connections are grouped into a single session. Similarly, TCP flows belonging to a SMTP transaction (between SMTP HELO to QUIT) become a single SMTP session. Likewise, DP flows to the same DNS access turn into a DNS session.

In one or more embodiments, the session block generator (102) is further configured to analyze the application sessions to determine session blocks (e.g., session block A (122a), session block N (122n)). Specifically, each session block includes application sessions sharing an IF address and is defined based on a minimum separation time with any other session block sharing the IP address. In one or more embodiments, this IP address is assigned to a user computing device by a mobile network service provider. Additional details of determining session blocks are described in reference to FIG. 1B below.

In one or more embodiments of the invention, the user activity profiler (108) includes the user session block identifier (103) that is configured to extract user identifiers (e.g., user identifier (124)) from the application sessions based on a pre-determined criterion. Generally, the application sessions relate to multiple users of the mobile data network D (101d). In one or more embodiments, the user identifier is an online social network (OSN) user identifier, and the pre-determined criterion is based on an OSN-specific parsing algorithm applied to the application sessions.

As noted above, many OSN sites "leak" the OSN user identifiers, which provide the basis for attributing network traffic to real users. Since each OSN has its own specific design, bit-strings/character-strings (e.g., in HTTP headers) used by an OSN for uniquely identifying each user are empirically determined as a basis for the OSN-specific parsing and analysis. Apart from the user identifiers used by OSN sites, other user identifiers such as email addresses are often leaked by various services and protocols (e.g., unencrypted webmail, POP, or IMAP) and can therefore be used as user identifiers for the purpose of traffic attribution. In one or more embodiments, the pre-determined criterion for extracting email address as user identifiers is based on a layer-7-application-specific parsing algorithm applied to the application sessions. TABLE 1 summarizes example formats of user identifiers and where they are located.

TABLE 1

| OSN IDs | Where to find | String to find | Sess. coverage |
| --- | --- | --- | --- |
| OSN1 ID | *.osn1domain.com:URL<br>HTTP:cookie<br>HTTP:cookie | session_key=#####-<OSN1_ID><br>c_user=<OSN1_ID>:<br>m_user=email%3a<OSN1_ID> | 166441/1.3% |
| OSN2 ID | *.osn2domain.com | oauth_token=<OSN2_ID>-##### | 119849/1.0% |
| Email addr. | HTTP:cookie<br>IMAP/POP3:payload<br>MSN:payload | m_user=email%3aOSN1_ID<br>USER=email@domain.com<br>MSNMSGR=email@domain.com | 24147/0.2% |

In one or more embodiments, the user session block identifier (103) is further configured to extract a traffic marker (e.g., traffic marker (125)) from the session blocks (121) based on a user identifier (e.g., user identifier (124)). In one or more embodiments, the traffic marker (125) is a data string, such as key-value strings(s) of a cookie. In one or more embodiments, the traffic marker (125) is another user identifier (e.g., OSN user identifier or email address) used by the same user. In one or more embodiments, the traffic marker (125) is identified based on a measure of co-occurrence in the session blocks (121) between the user identifier (124) and a data string. Specifically, the data string is identified as the traffic marker (125) in response to the measure meeting a pre-determined threshold. In one or more embodiments, the measure includes a uniqueness measure and a persistence measure. Additional details of extracting the traffic marker (125) from the session blocks (121) based on the user identifier (124) are described in reference to FIG. 1B below.

In one or more embodiments, the user session block identifier (103) is further configured to identify a first portion of the session blocks (121) based on the user identifier (124). In particular, each session block in the first portion contains the user identifier (124) and is thus associated with mobile network activities of a user identified by the user identifier (124). For example, the first portion may include the session block A (122a) that is identified to contain the user identifier (124). In one or more embodiments, the user session block identifier (103) is further configured to identify a second portion of the session blocks (121) based on the traffic marker (125). In particular, each session block in the second portion contains the traffic marker (125) and is thus associated with mobile network activities of the user. For example, the second portion may include the session block N (122n) that is identified to contain the traffic marker (125). In one or more embodiments, the first and second portions of the session blocks (121) identified above are filtered by eliminating any session block that contains more than one user identifier or contains more than one time-to-live (TTL) values.

In one or more embodiments of the invention, the user activity profiler (108) includes the user activity analyzer (104) that is configured to analyze the first portion and the second portion of the session blocks (121) to determine a measure of a mobile network activity of the user. For example, domain name service (DNS) server names may be extracted from the first portion and the second portion of the session blocks (121) and analyzed to determine the measure of the mobile network activity of the user. Accordingly, multiple users' various activities in the mobile network can be characterized. Further, user profiles may be extracted from the mobile network based on user identifiers of these multiple users. In one or more embodiments, a measure of privacy leak in the mobile network is generated based on the user profiles and various measures of mobile network activities of these users. Additional details of extracting the traffic marker (125) from the session blocks (121) based on the user identifier (124) are described in the example shown in FIGS. 3A and 3B below.

Figure 1B:
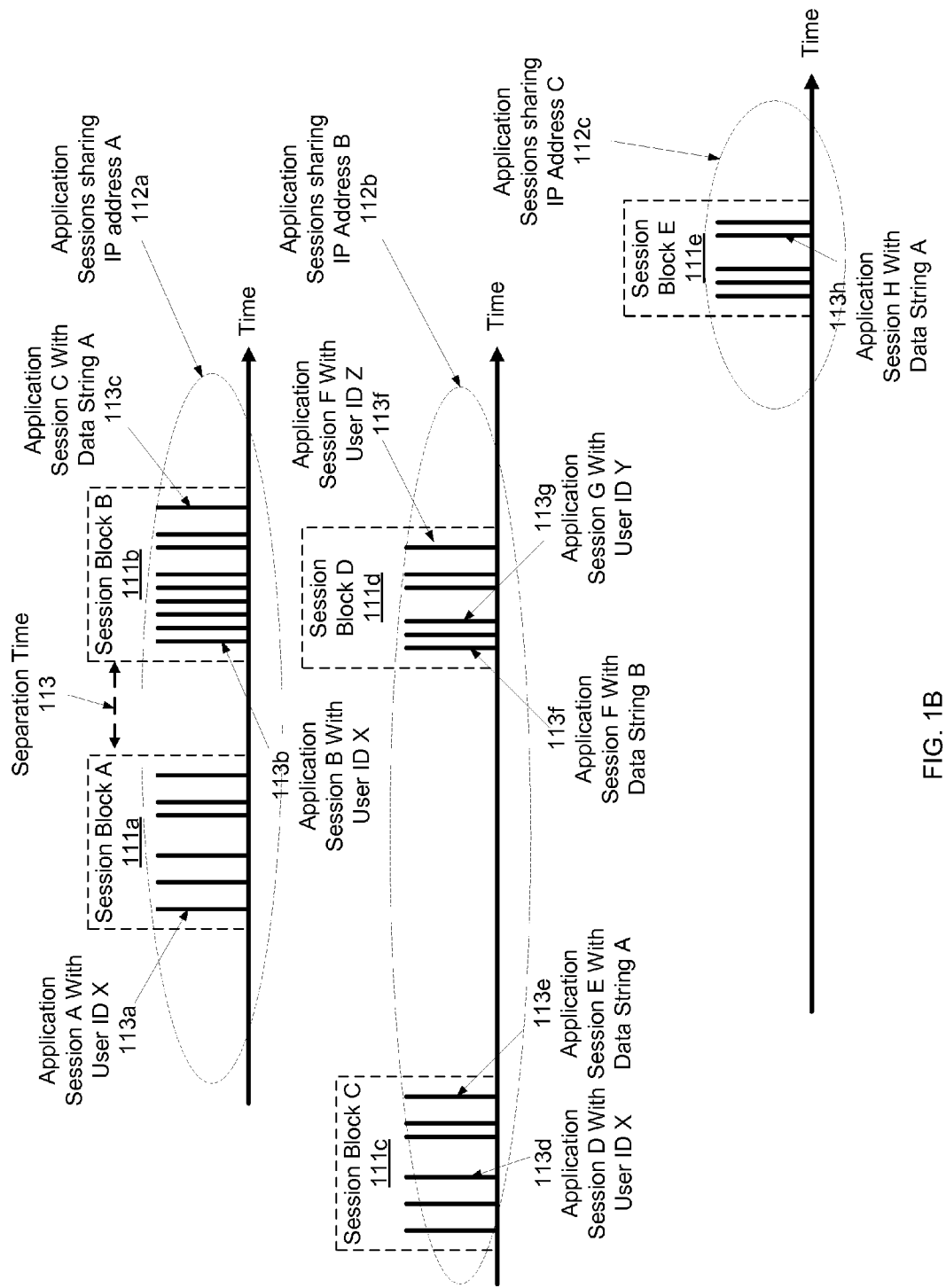
FIG. 1B shows a schematic block diagram according to aspects of the invention.

FIG. 1B shows a schematic diagram of session blocks in accordance with one or more embodiments of the invention. Those skilled in the art, having the benefit of this detailed description, will appreciate the components shown in FIG. 1B may differ among embodiments of the invention, and that one or more of the components may be optional. Although specific numbers of components are shown in FIG. 1B, different number of each component may be included. In one or more embodiments of the invention, one or more of the components shown in FIG. 1B may be omitted, repeated, supplemented, and/or otherwise modified from that shown in FIG. 1B. Accordingly, the specific arrangement of components shown in FIG. 1B should not be construed as limiting the scope of the invention.

Generally, the application sessions containing user identifiers (e.g., OSN user identifier or email address) cover only a small fraction (about 2.3% in an example dataset containing 3 hours worth of a cellular data network traffic) of all application sessions. FIG. 1B illustrates how these application sessions containing user identifiers are used as anchors to further expand their coverage for traffic attribution. Because of the dynamic IP address assignment commonly used by cellular data service providers, each mobile device is assigned with an IP address for a time duration when the device is continually active. Hence traffic activities occurring on the same IP address within a short period of time are likely generated by the same mobile device. Further, a majority of traffic generated by various applications and browsers on mobile devices are HTTP-based; the HTTP header fields (e.g., URL, cookie) often contain certain <attribute-value> strings (also referred to as key-value strings) to thread together stateless HTTP request/reply messages and keep track of the webpages users visited, their devices, or users themselves. When appropriately culled from the HTTP header fields, some of these strings, in conjunction with OSN identifiers, can be used to help attribute (especially non-OSN) HTTP traffic to users. Such strings are referred to as traffic markers.

FIG. 1B shows three groups of sessions (i.e., application sessions) along concurrent time lines; namely, sessions sharing IP address A (112*a*), sessions sharing IP address B (112*b*), and sessions sharing IP address C (112*c*), where each vertical bar denotes a session. For example, IF address A, B, and C may be source IP addresses assigned to user mobile devices and found in flows from these mobile devices. Generally throughout this disclosure, in particular in the description in reference to FIG. 1 B, the term "IP address" refers to mobile network service provider assigned W address. In one or more embodiments, the sessions are grouped into distinct blocks using the following heuristic: two consecutive sessions belong to the same block if and only if they share the same dynamically assigned IP address and the idle period (i.e., the ending time of the previous session to the starting time of the next session) between them is less than delta seconds, where delta is a parameter depending on the dynamic IP assignment scheme used by the cellular data service provider. In other words, any two session blocks (e.g., session block A (111*a*) and session block B (111*b*)) on the same IP address (e.g., IP address A) are separated from each other by an idle period (e.g., separation time (113)) longer than delta seconds. For an example cellular data service provider, delta is set as 60 seconds based on the analysis of the idle period distribution in this specific network. In this example network, an IP address stays with the registered device as long as the device generates sessions at a rate greater than or equal to one session every 60 seconds. Therefore, if a device is not idle for more than 60 seconds, the device's assigned IP address will not change. Conversely, if the device is idle for more than 60 seconds, the device's assigned. IP address will change. In the example shown in FIG. 1B, the session blocks A through E (111*a*-111*e*) may be part of the session blocks (121) shown in FIG. 1A. In particular, the session block A (111*a*), session block B (111*b*), and session block C (111*c*), although on two separate IP addresses, are attributed to the same user because they all contain the user identifier (ID) X. In the aforementioned example dataset, 12,495,482 sessions are segmented into 99,234 session blocks after applying this simple heuristic.

Several factors may complicate the above simple heuristic, which can cause it to generate blocks (i.e., session blocks) which may not belong to a single user. One factor is the presence of WiFi devices in the data. Another is phone tethering which allows additional devices (e.g., a laptop or a tablet computer equipped only with WiFi) to access the Internet via a tethered mobile device. In addition, a phone may be shared by more than one user within a short period of time, or a user may have multiple OSN accounts. To address these issues, two filtering methods are used to identify blocks that likely belong to more than one user (referred to as hotspot blocks). The first method exploits the heterogeneity of the TTL (time-to-live) value contained in the (layer-3) IP datagram headers. Various common operating systems (OSes) set different initial TTL values. For example, several OSes uses TTL=64, while others set it to 128). In the example dataset, 1,554 blocks out of 99,234 blocks contain IP datagrams with more than one TTL value and are identified as hotspot blocks, which are discarded before further analysis.

The second method directly employs OSN identifiers and traffic markers to identify blocks that belong to more than one user. Any session block containing two distinct user identifiers of the same OSN are identified as multi-user block, which are also discarded before further analysis. For example, application session G with user ID Y and application session F with user ID Z co-occur in the session block D (111*d*), which is identified as multi-user block and discarded. In the example dataset, 563 blocks are found to contain conflicting OSN identifiers.

In order to identify and attribute other session blocks containing no user identifiers (e.g., OSN user identifier or email address) but are likely to be generated by the same users, the cookies and other key-value strings in the HTTP headers, referred to as traffic markers, are used. As noted above, these traffic markers are generated and used by various web services to thread together stateless HTTP request/reply messages and keep track of the webpages users visited, user devices, or users themselves. Generally, the existences, formats and meanings of the traffic markers are mostly site-specific. Further, there are a huge variety of them, many of which are dynamically generated. For instance, for a cookie used to track pages visited within a website, its value changes from page to page and are not suitable as a traffic marker to attribute session blocks to users. Instead, those that are longer-lasting (e.g., used in tracking users or their devices) are more suitable as traffic markers to attribute session blocks to users.

Let $U=\{u_i\}$ be a set of users discovered in the data, where each user $u_i$ is defined by a set of user identifiers (e.g., OSN identifiers or email addresses) he/she possesses. (For notational clarity, an OSN user and its identifiers are treated equivalently.) Let $M=\{m_l\}$ be a set of potential candidate traffic markers, where each marker $m_l$ is typically expressed in the form of key-value pairs, such as $(k_l, v_l)$. Two (potential) traffic markers $m_h=(k_h, v_h)$ and $m_l=(k_l, v_l)$ are of the same type if $k_h=k_l$ but $v_h$ does not equal $v_l$. Let T denotes the duration of a (significantly long) observation period, e.g., T=3 hours when using the example dataset. Given a pair of $(u_i, m_l)$, $P(u_i, m_l)$ denotes the probability that user $u_i$ and marker $m_l$ co-occur within a session block. For example, application session B with user ID X (113*b*) and application session C with data string A (113*c*) co-occur within the session block B (111*b*), application session D with user ID X (113*d*) and application session E with data string A (113*e*) co-occur within the session block C (111*c*).

In one or more embodiments, $P(u_i, m_l)$ is computed as the total duration of the blocks that contain both $u_i$ and $m_l$ divided by the total duration of all blocks containing any user in U. In one or more embodiments, a uniqueness measure is defined as below. Given a pair $(u_i, m_l)$ where $P(u_i, m_l) > 0$, the uniqueness of $(u_i, m_l)$, denoted by $\psi(u_i, m_l)$, is defined as $$\Psi(u_i, m_l) := 1 - \Sigma_{j \neq i: u_j \in U} P(u_j, m_l)$$

From the above definition, if $\psi(u_i, m_l)=1$, then the candidate traffic marker $m_l$ is uniquely associated with the user $u_i$. Otherwise, the same marker has also been observed to be associated with another user, signifying that it is not a useful traffic marker. Hence using the uniqueness measure, all key-value strings in the HTTP header fields that are not useful candidates for traffic markers are discarded.

Among all candidate traffic markers uniquely associated with each user, many of them may be ephemeral, i.e., change from one webpage to another or from one user session to another). This leads to defining a persistence measure as below. Given a pair $(u_i, m_l)$ where $\psi(u_i, m_l)=0$, and $\psi(u_i, m_l)=1$, the persistence of $(u_i, m_l)$, denoted by $\Pi(u_i, m_l)$, is defined as $$\Pi(u_i, m_l) := 1 - \Sigma_{h \neq l: m_h \in M} P(u_i, m_h) / P(u_i)$$

$$P(u_i) := \Sigma_{m_l \in M} P(u_i, m_l)$$

From the above definition, if $\Pi(u_i, m_l)=1$ or approximately 1 (e.g., 0.9), then the candidate marker co-occurs with $u_i$ almost all the time throughout the observation period. Hence $m_i$ serves as a useful candidate traffic marker, and thus can be used to attribute other session blocks which contain $m_i$ but not $u_i$ to user $u_i$. In addition, using this persistence property, most session-specific or page-specific cookies, whose values change from one webpage to another or from one user session to another, are discarded as their persistence values are generally very low. For example as shown schematically in FIG. 1B, data string A co-occurs with user ID X in a unique and persistent manner (e.g., in session block B (111b), session block C (111c), etc.) and is identified as a useful traffic marker for the user ID X. Accordingly, the session block E (111e), that contains the data string A but not the user ID X, is attributed to the user identified by the user ID X as described above regardless if it is on the same IP address with any other session block already attributed to the user. In contrast, data string B and user ID Y only co-occur in the session block D (111d) and fail to meet the threshold (e.g., 1) required for the uniqueness measure or the threshold (e.g., higher than 0.9) required for the persistence measure, therefore the data string B is not identified as a useful traffic marker for the user ID Y. In the example dataset, 625 types of traffic markers are identified. TABLE 2 lists 10 types that are most commonly seen in the data. Most of these markers are located inside the cookie field of the HTTP header listed in the "string to match" column of TABLE 2. As an exception, the "admob.com" identifier, is found in a specific string "X-Admob-ISU" in the packet payloads.

TABLE 2

| Traffic marker domain | Category | Where to find | String to match |
|---|---|---|---|
| admob.com | Ad | HTTP:X-Admob-ISU | X-Admob-ISU |
| atdmt.com, msn.com, bing.com | Ad | HTTP:cookie | muid |
| doubleclick.net | Ad | HTTP:cookie | id |
| mydas.mobi | Ad | HTTP:cookie | mac-id |
| google.com. | Sid | HTTP:cookie | sid |
| craigslist.org | Uid | HTTP:cookie | cl_b |
| yahoo.com | Uid | HTTP:cookie | c |
| scorecardresearch.com | Tid | HTTP:cookie | uid |
| quantserve.com | Tid | HTTP:cookie | mc |
| google-analytics.com | Tid | HTTP:cookie | utmcc |

These 625 example traffic markers are grouped into four categories in TABLE 2 based on the purpose they serve, namely, advertisement (Ad), personalized logins (Uid), tracking users (Tid), and tracking service sessions(Sid).

Figure 2:
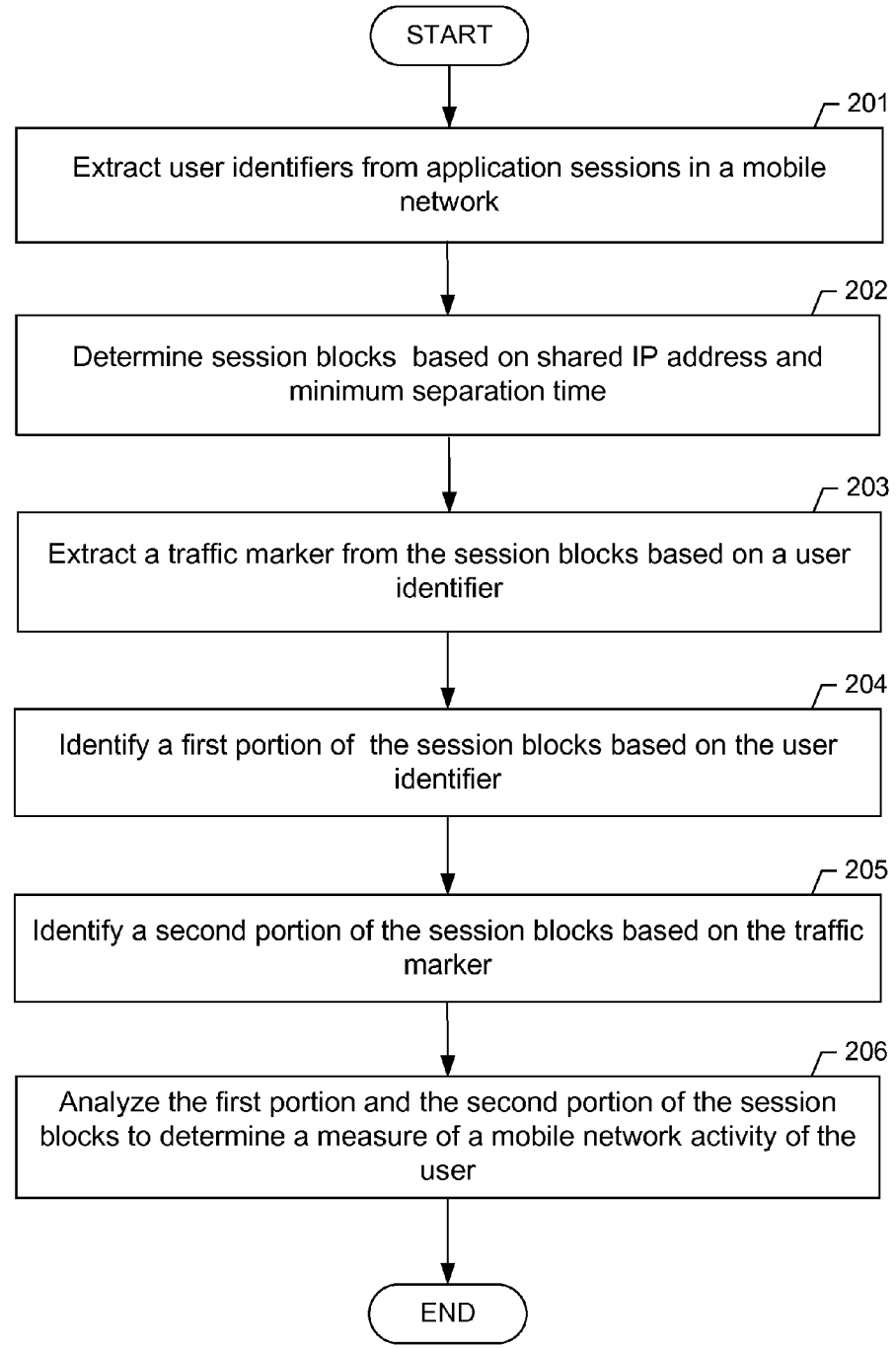
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1A above.

Initially in Step 201, user identifiers are extracted from application sessions based on a pre-determined criterion. In one or more embodiments, the user identifier is an online social network (OSN) user identifier, and the pre-determined criterion includes an OSN-specific parsing algorithm applied to the application sessions. In one or more embodiments, the user identifier is an email address, and the pre-determined criterion includes a layer-7-application-specific parsing algorithm applied to the application sessions. In one or more embodiments, the user identifiers are extracted using the user session block identifier (103) of FIG. 1A as described above. For example as shown in FIG. 1B, the user identifiers include user ID X, user ID Y, and user ID Z.

In Step 202, session blocks are determined by analyzing the application sessions based on shared IP address and minimum separate time. Specifically, each session block includes application sessions sharing an IP address and is defined based on a minimum separation time with any other session block sharing the IP address. In one or more embodiments, the session blocks are determined using the session block generator (102) of FIG. 1A as described above. For example as shown in FIG. 1B, the session blocks includes session block A (111a) through session block E (111e).

In Step 203, a traffic marker is extracted from the session blocks based on a user identifier. In one or more embodiments, a measure of co-occurrence in the session blocks is determined between the user identifier and a data string, where the data string is identified as the traffic marker in response to the measure meeting a pre-determined threshold. In one or more embodiments, the measure includes one or both of a uniqueness measure and a persistence measure. In one or more embodiments, the traffic marker is extracted using the user session block identifier (103) of FIG. 1A as described above. For example as shown in FIG. 1B, the data string A is identified as a traffic marker based on the user ID X.

In Step 204, a first portion of the session blocks is identified based on the user identifier. In particular, the first portion of the session blocks is associated with mobile network activities of a user identified by the user identifier. In one or more embodiments, the first portion of the session blocks is identified using the user session block identifier (103) of FIG. 1A as described above. For example as shown in FIG. 1B, the first portion includes the session block A (111a), session block B (111b), session block C (111c), etc.

In Step 205, a second portion of the session blocks is identified based on the traffic marker. In particular, the second portion of the session blocks is also associated with mobile network activities of the user identified by the user identifier. In one or more embodiments, the second portion of the session blocks is identified using the user session block identifier (103) of FIG. 1A as described above. Further, any session block that contains two or more user identifier or two or more time-to-live values are eliminated from the first portion and the second portion of the plurality of the session blocks. For example as shown in FIG. 1B, the second portion includes the session block E (111e), etc. with the session block D (111d) eliminated as it contains two user identifiers ID Y and ID Z.

In Step 206, the first portion and the second portion of the session blocks are analyzed to determine a measure of a mobile network activity of the user. In one or more embodiments, domain name service (DNS) server names from the first portion and the second portion of the session blocks are analyzed to determine the measure of the mobile network activity of the user. Further, user profiles are extracted from online social networks based on user identifiers of multiple users to generate a measure of privacy leak on the public domain of the Internet in conjunction with mobile network activities of these users. In one or more embodiments, the mobile network activity measure of each user and privacy leakage for multiple users in the mobile network are determined using the user activity analyzer (104) of FIG. 1A as described above. For example as shown in FIG. 1B, the first portion includes all sessions contained in the session block A (111a), session block B (111b), session block C (111c), session block E (111e), etc. are attributed to the same user and are analyzed to extract all DNS server names for profiling the user activity in the mobile network.

In summary, with the set of traffic markers $M(u_i)$ of user $u_i$, the traffic attribution can be done in a straightforward fashion: a block is attributed to user $u_i$, if and only if it contains either an user identifier (e.g., an OSN identifier or email address) of user $u_i$ or a traffic marker $m_j$ in $M(u_i)$. The first two rows of

TABLE 3 summarize and compare the results of Step 206.

| Tessellation-Steps | Session Coverage per User (avg/ 90-percentile) | Time Coverage per User (avg/ 90-percentile) | Total Session Coverage | Uniqueness Ψ |
|---|---|---|---|---|
| OSN ID extraction | 14/7 | 11.8/8.3 [min] | 2.4% (297, 358) | 1 |
| Traffic attribution | 326/176 | 65.4/62.3 [min] | 49.8% (6,217, 036) | 1 |
| Activity analysis | 586/530 | 82.3/81.0 [min] | 78.6% (9,831, 924) | >0.98 |

At the beginning of traffic attribution (referred to in TABLE 3 as "Tessellation"), an OSN user identifier only can attribute an average of 14 sessions that last for a total duration of 11.8 minutes, as shown in the first row of TABLE 3. Adding traffic markers, an average of 326 sessions can be attributed to a user, lasting a total of 65.4 minutes, as shown in the second row of TABLE 3. For bottom 90% of the users (i.e., users with their OSN identities appearing less frequently), a more dramatic improvement is seen: their average session coverage increase from 7 to 176 and their time coverage increase from 8.3 to 62.3 minutes. Considering the total number of sessions, Tessellation puts a half (49.8%) of all traffic under the known user category. Additional details of analyzing session blocks attributed to a user and determining one or more measures of the user's mobile network activity are described in an example in FIG. 3A below. In the description of the example in FIG. 3A, measures of the user's mobile network activity are collectively referred to as "user mosaic," and determining these measures is referred to as "tessellating the user mosaic."

Figures 3A, 3B:
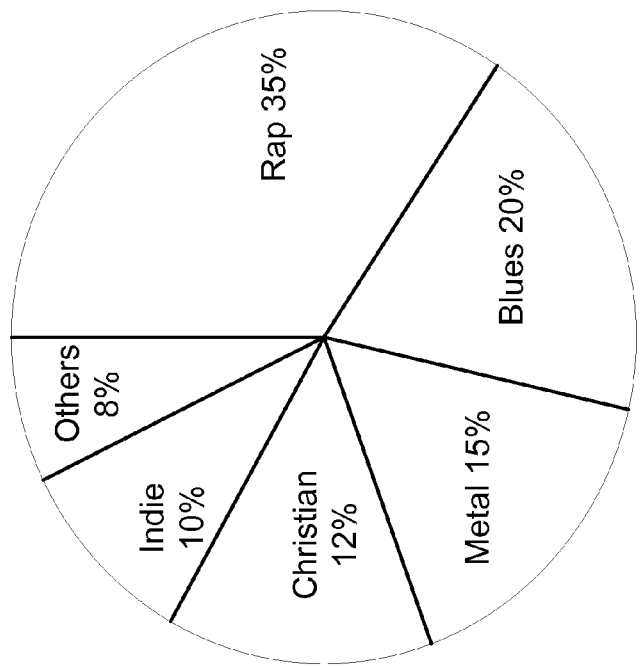
FIGS. 3A-3B show various examples according to aspects of the invention.

FIGS. 3A and 3B show application example results in accordance with embodiments of the invention.

FIG. 3A shows a user mosaic constructed using information mined from the session blocks attributed to a user. The user activities are categorized into twelve categories corresponding to the twelve boxes in the user mosaic. For example, these twelve categories may be identified based on top 12 most frequently occurring DNS server names found in the session blocks attributed to the user. In one or more embodiments, each box is highlighted using color or pattern to represent amount of information mined from the session blocks attributed to the user. In one or more embodiments, each box is highlighted using color or pattern to represent a measure of user activity as determined from the session blocks attributed to the user.

To illustrate the process of tessellating the user mosaic, the example of FIG. 3A may be related to a specific user aliased as "Alice"

In building Alice's mosaic, information is mined from the following three main sources: (i) user activity analysis as described earlier, which not only reveals the types of activities Alice engages in, but also how much time she typically spends on each activity, and so forth; (ii) user-specific, static or dynamic, information in various "digital footprints" left by Alice during her online activities; and (iii) other publicly available pieces of information about Alice that can be crawled from the global Internet (e.g., those voluntarily disclosed in Alice's public OSN profiles).

In general, the "publicly available" information extracted from crawling the OSN sites or searching the global Internet is at a coarser granularity and largely static. For example, Alice may disclose in her public OSN profile her resident city and state, affiliation, education history, and her interests. But typically she will not disclose her precise home or work address, where she is currently located, whom she has just messaged, what songs she listened in the past hour, and other pieces of information that is dynamic in nature. In the case of Alice, her first and last name, the city she lives in (City X, State Y), the city she is from (City Z, State Y), her favorite TV shows (Sex and the city, etc.), and music artists (Bob Marley, etc.) are discovered by crawling her online social network profile page.

Mining and gleaning information in the digital footprints left by Mice, on the other hand, can reveal far more about her. For instance, through the activity analysis using the 3h-Dataset, it is discovered that Mice spent 72% of her time (1.93 hrs out of 2.66 hrs) in shopping goods in three different e-commerce sites. In the majority of her remaining time (0.6 hrs), she moved back and forth between a OSN site and a online game site. In the mean time, her computer updated its OS and virus signature in the background.

FIG. 3B shows a pie chart of music listening preferences tallied over multiple users based on amount of time each user spent accessing music service providers (e.g., identified based on DNS server names), as determined from the session blocks attributed to the respective user.

Although specific formats or structures are used as examples in the foregoing description regarding the flows, the captured payloads, the signature terms, filtering layer/qualification loop structures, etc., one skilled in the art, with the benefit of this disclosure, will recognize that other formats or structures may also be used in the system and methods described without deviating from the spirit of the invention.

Figure 4:
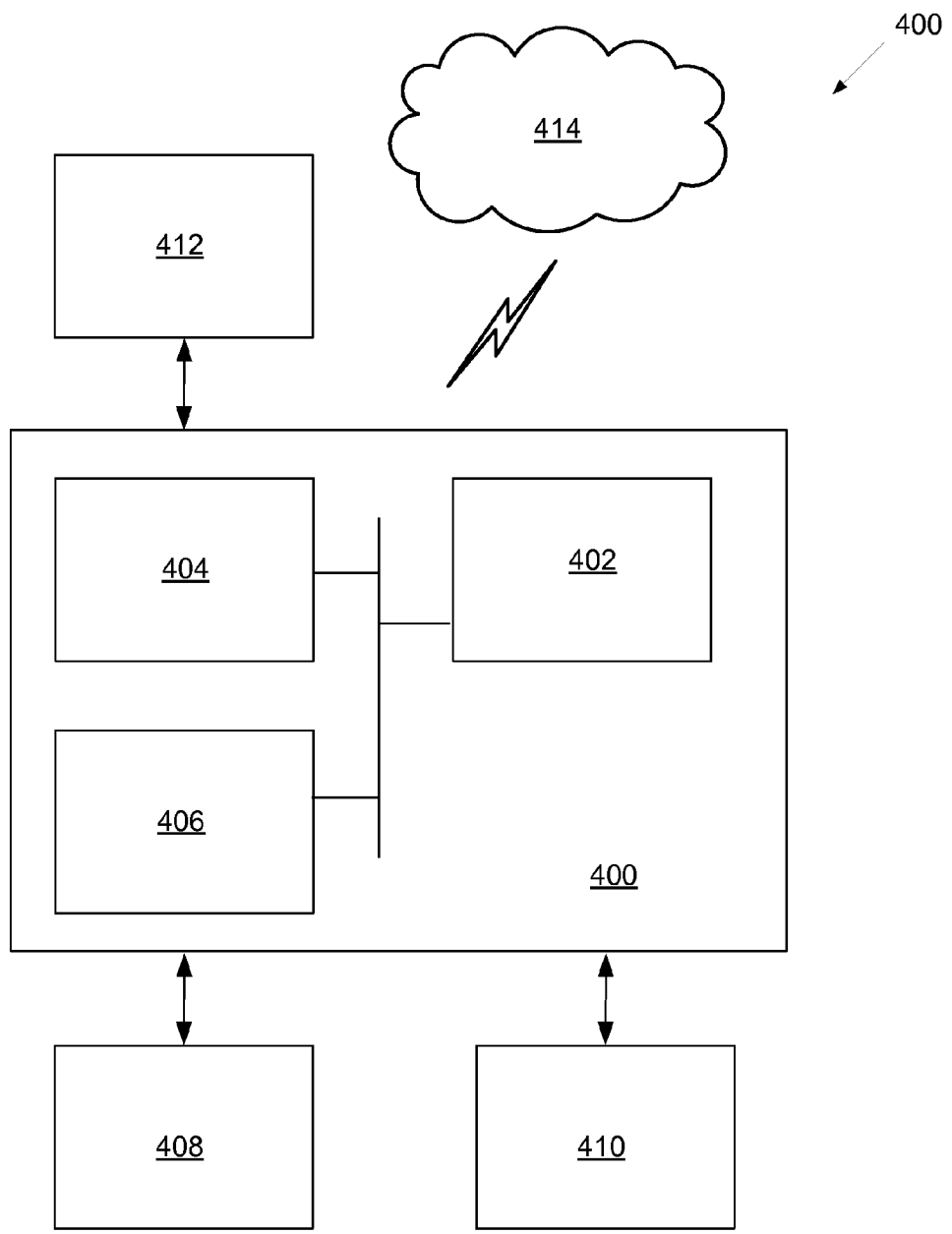
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (414) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively Correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling user activity in a mobile network, comprising:
    identifying, from the mobile network, a plurality of application sessions;
    extracting, by a computer processor, a plurality of user identifiers from the plurality of application sessions based on a pre-determined criterion;
    analyzing, by the computer processor, the plurality of application sessions to determine a plurality of session blocks, wherein each session block comprises a plurality of application sessions sharing an IP address and is defined based on a minimum separation time with any other session block sharing the IP address;
    extracting, by the computer processor, a traffic marker from the plurality of session blocks based on a user identifier of the plurality of user identifiers, wherein extracting the traffic marker comprises:
        determining a measure of co-occurrence in the plurality of session blocks between the user identifier and a data string; and
        identifying the data string as the traffic marker in response to the measure meeting a pre-determined threshold;
    identifying a first portion of the plurality of the session blocks based on the user identifier, wherein the first portion of the plurality of the session blocks is associated with first mobile network activities of a user identified by the user identifier;
    identifying a second portion of the plurality of the session blocks based on the traffic marker, wherein the second portion of the plurality of the session blocks is associated with second mobile network activities of the user; and
    analyzing, by the computer processor, the first portion and the second portion of the plurality of the session blocks to determine a measure of a mobile network activity of the user.

2. The method of claim 1,
    wherein the user identifier comprises at least one selected from a group consisting of an online social network (OSN) user identifier and an email address, and
    wherein the pre-determined criterion comprises at least one selected from a group consisting of an OSN-specific parsing algorithm and a layer-7-application-specific parsing algorithm applied to the plurality of application sessions.

3. The method of claim 1, wherein the measure comprises a uniqueness measure and a persistence measure.

4. The method of claim 1, further comprising:
    extracting a plurality of domain name service (DNS) server names from the first portion and the second portion of the plurality of the session blocks; and
    analyzing the plurality of DNS server names to determine the measure of the mobile network activity of the user.

5. The method of claim 4, further comprising:
    extracting a user profile from the mobile network based on the user identifier; and
    generating a measure of privacy leak in the mobile network based at least on the user profile and the measure of the mobile network activity of the user.

6. The method of claim 1, further comprising:
    determining that a session block contains at least one selected from a group consisting of two or more user identifier and two or more time-to-live values; and
    eliminating the session block from the first portion and the second portion of the plurality of the session blocks.

7. A system for profiling user activity in a mobile network, comprising:
    a processor and memory;
    a session block generator comprising instructions stored in the memory, when executed on the processor having functionality to:
        identify, from the mobile network, a plurality of application sessions; and
        analyze the plurality of application sessions to determine a plurality of session blocks, wherein each session block comprises a plurality of application sessions sharing an IP address and is defined based on a minimum separation time with any other session block sharing the IP address;
    a user session block identifier comprising instructions stored in the memory, when executed on the processor having functionality to:
        extract a plurality of user identifiers from the plurality of application sessions based on a pre-determined criterion;
        extract a traffic marker from the plurality of session blocks based on a user identifier of the plurality of user identifiers, wherein extracting the traffic marker comprises:
            determining a measure of co-occurrence in the plurality of session blocks between the user identifier and a data string; and
            identifying the data string as the traffic marker in response to the measure meeting a pre-determined threshold;
        identify a first portion of the plurality of the session blocks based on the user identifier, wherein the first portion of the plurality of the session blocks is associated with first mobile network activities of a user identified by the user identifier; and identify a second portion of the plurality of the session blocks based on the traffic marker, wherein the second portion of the plurality of the session blocks is associated with second mobile network activities of the user; and a user activity analyzer comprising instructions stored in the memory, when executed on the processor having functionality to:

analyze the first portion and the second portion of the plurality of the session blocks to determine a measure of a mobile network activity of the user.

8. The system of claim 7,
wherein the user identifier comprises at least one selected from a group consisting of an online social network (OSN) user identifier and an email address, and
wherein the pre-determined criterion comprises at least one selected from a group consisting of an OSN-specific parsing algorithm and a layer-7-application-specific parsing algorithm applied to the plurality of application sessions.

9. The system of claim 7, wherein the measure comprises a uniqueness measure and a persistence measure.

10. The system of claim 7, the user activity analyzer further comprising instructions stored in the memory, when executed on the processor having functionality to:
extract a plurality of domain name service (DNS) server names from the first portion and the second portion of the plurality of the session blocks; and
analyze the plurality of DNS server names to determine the measure of the mobile network activity of the user.

11. The system of claim 10, the user activity analyzer further comprising instructions stored in the memory, when executed on the processor having functionality to:
extract a user profile from the mobile network based on the user identifier; and
generate a measure of privacy leak in the mobile network based at least on the user profile and the measure of the mobile network activity of the user.

12. The system of claim 7, the user session block identifier further comprising instructions stored in the memory, when executed on the processor having functionality to:
determine that a session block contains at least one selected from a group consisting of two or more user identifier and two or more time-to-live values; and
eliminate the session block from the first portion and the second portion of the plurality of the session blocks.

13. A non-transitory computer readable medium embodying instructions for profiling user activity in a mobile network, the instructions when executed by a processor comprising functionality for:
identifying, from the mobile network, a plurality of application sessions;
extracting a plurality of user identifiers from the plurality of application sessions based on a pre-determined criterion;
analyzing the plurality of application sessions to determine a plurality of session blocks, wherein each session block comprises a plurality of application sessions sharing an IP address and is defined based on a minimum separation time with any other session block sharing the IP address;
extracting a traffic marker from the plurality of session blocks based on a user identifier of the plurality of user identifiers, wherein extracting the traffic marker comprises:
determining a measure of co-occurrence in the plurality of session blocks between the user identifier and a data string; and
identifying the data string as the traffic marker in response to the measure meeting a pre-determined threshold;
identifying a first portion of the plurality of the session blocks based on the user identifier, wherein the first portion of the plurality of the session blocks is associated with first mobile network activities of a user identified by the user identifier;
identifying a second portion of the plurality of the session blocks based on the traffic marker, wherein the second portion of the plurality of the session blocks is associated with second mobile network activities of the user; and
analyzing the first portion and the second portion of the plurality of the session blocks to determine a measure of a mobile network activity of the user.

14. The non-transitory computer readable medium of claim 13,
wherein the user identifier comprises at least one selected from a group consisting of an online social network (OSN) user identifier and an email address, and
wherein the pre-determined criterion comprises at least one selected from a group consisting of an OSN-specific parsing algorithm and a layer-7-application-specific parsing algorithm applied to the plurality of application sessions.

15. The non-transitory computer readable medium of claim 13, wherein the measure comprises a uniqueness measure and a persistence measure.

16. The non-transitory computer readable medium of claim 13, the instructions when executed by a processor further comprising functionality for:
extracting a plurality of domain name service (DNS) server names from the first portion and the second portion of the plurality of the session blocks; and
analyzing the plurality of DNS server names to determine the measure of the mobile network activity of the user.

17. The non-transitory computer readable medium of claim 16, the instructions when executed by a processor further comprising functionality for:
extracting a user profile from the mobile network based on the user identifier; and
generating a measure of privacy leak in the mobile network based at least on the user profile and the measure of the mobile network activity of the user.

18. The non-transitory computer readable medium of claim 13, the instructions when executed by a processor further comprising functionality for:
determining that a session block contains at least one selected from a group consisting of two or more user identifier and two or more time-to-live values; and
eliminating the session block from the first portion and the second portion of the plurality of the session blocks.

* * * * *